United States Patent [19]
Jeppson et al.

[11] Patent Number: 5,280,603
[45] Date of Patent: Jan. 18, 1994

[54] SERVO PAUSE FOR DISK DRIVE EMBEDDED MULTI-TASKED CONTROLLER

[75] Inventors: David B. Jeppson, Livermore; Norman H. Wulferdinger, Boulder Creek; Bryan J. Mee; William N. Thanos, both of San Jose; Joseph C. Liu, Milpitas, all of Calif.

[73] Assignee: Quantum Corporation, Milpitas, Calif.

[21] Appl. No.: 762,887

[22] Filed: Sep. 19, 1991

[51] Int. Cl.$^5$ .............................. G06F 3/00
[52] U.S. Cl. ...................... 395/425; 395/275; 395/725; 364/DIG. 1; 360/69
[58] Field of Search ............ 395/425, 275, 725; 360/69; 364/200MS, 900MS

[56] References Cited

U.S. PATENT DOCUMENTS 4,882,671 11/1989 Graham et al. ............... 395/275
5,050,016 9/1991 Squires ...................... 360/77.08

OTHER PUBLICATIONS

Leibson, Steve; "The Handbook of Microcomputer Interfacing"; TAB Books, Inc., 1983, p. 232.

Primary Examiner—David L. Robertson
Attorney, Agent, or Firm—David B. Harrison

[57] ABSTRACT

A method is provided for allocating digital processing activities of an embedded microcontroller within a disk drive between repetitive periodic digital servo loop service routines synchronized to rotation of a data storage disk of the drive and irregularly occurring host service routines supporting a high level, digital interface to a host computing environment. The new method comprises the steps of:

prioritizing the host service routines into priority routines and non-priority routines, detecting calls to one of the priority routines, and bypassing execution of a predetermined number of the servo loop service routines to enable execution of the called priority routine without interruption.

6 Claims, 8 Drawing Sheets

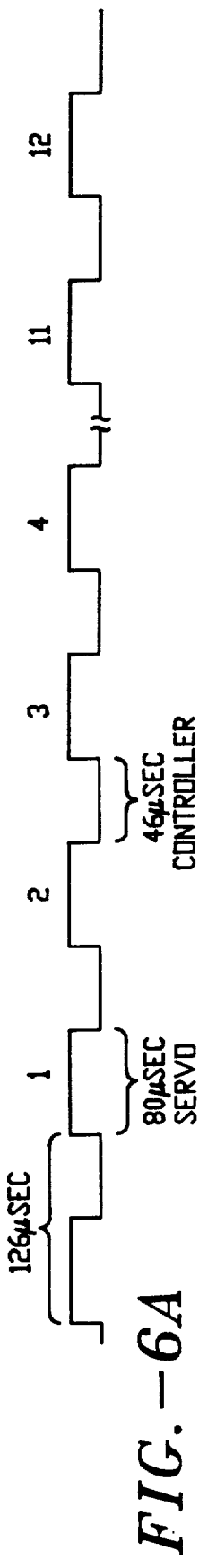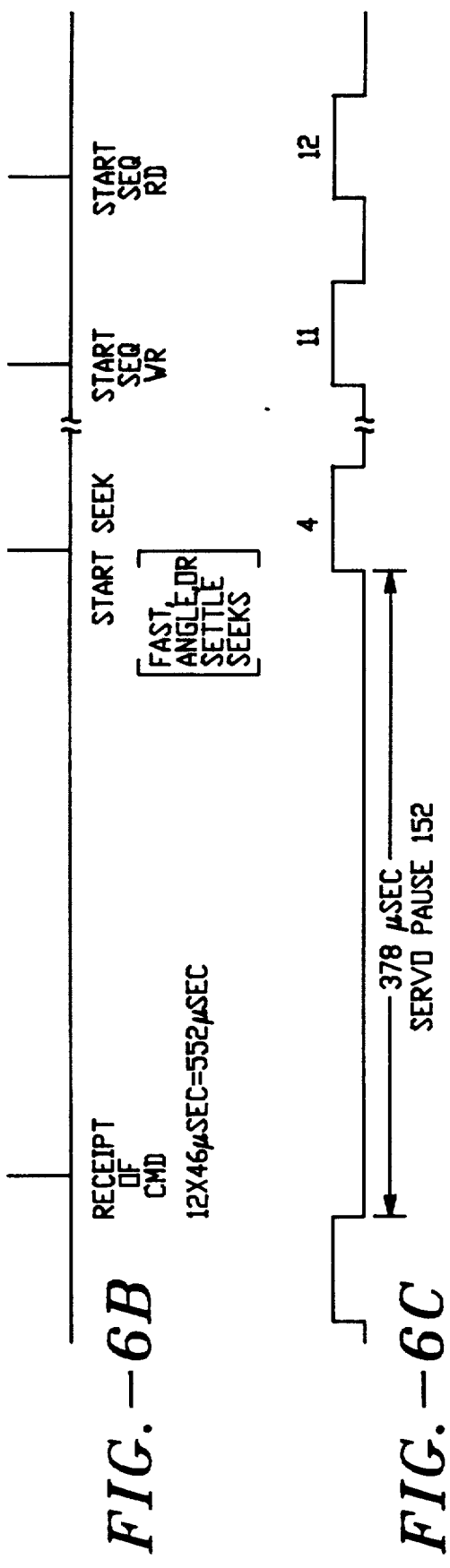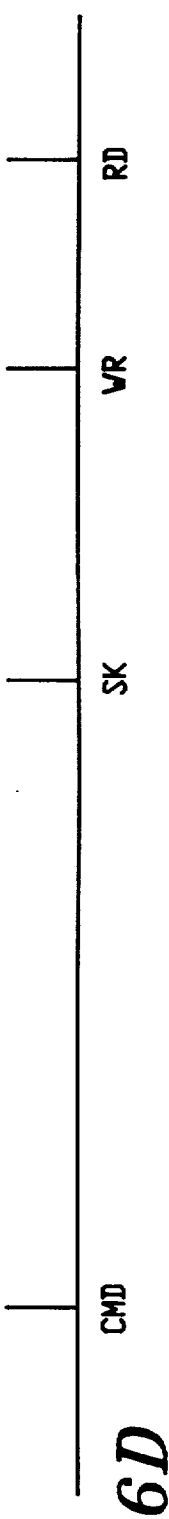

SERVO PAUSE FOR DISK DRIVE EMBEDDED MULTI-TASKED CONTROLLER

FIELD OF THE INVENTION

The present invention relates to head position control of disk drives. More particularly, the present invention relates to pausing a head position servo control task otherwise being performed by an embedded disk drive controller so that it is thereby able to perform a priority non-servo task.

BACKGROUND OF THE INVENTION

The use of a single programmed digital microcontroller in a disk drive to supervise a high level digital interface to a host and also to supervise a digital head positioner servo loop is known. One example is found in commonly assigned U.S. Pat. No. 5,005,089, entitled "High Performance, High Capacity MicroWinchester Disk Drive", the disclosure of which is hereby incorporated by reference. In the disk drive described in the referenced '089 patent, a polyphase optical encoder included a scale attached to a voice coil rotary actuator and provided two relative position phases P1 and P2 which were digitized and used by the microcontroller to determine head position. The position was further refined by a calibration routine which measured and stored reference head position data from the data storage surfaces. Also present in the '089 patent disk drive was a high level, digital interface, such as a SCSI interface (or an AT bus level interface). The microcontroller in the '089 patent disk drive divided its time between the head position servo and the interface, so that the head was correctly positioned as needed during seeking and track following, and so that host commands were received, decoded and acted upon, and command cleanup was performed. Since the servo tasks during track seeking required more frequent attention of the microcontroller, the time division between servo functions and data transfer (interface) functions was dynamically altered. The disk drive described in the referenced '089 patent was subsequently improved as described in commonly assigned U.S. Pat. No. 5,227,930, and entitled "Head Position Recalibration for Disk Drive", the disclosure of which is hereby incorporated by reference. The disk drive described in this later application provided for increased concentric data track densities, in part, by sampling storage disk runout and deriving and following an average track centerline based upon multiple circumferential samples.

The need to store higher quantities of data continues. Higher data densities may be obtained by increasing the number of data tracks per unit measure, such as per inch, abbreviated "TPI". Higher data densities may also be obtained by increasing the data transfer rates, and by adjusting data transfer rates to radial position of the data transducer head, as relative head-disk velocity varies with disk radius.

In order to increase the number of data tracks, the head gap may be made narrower, and disk runout characteristics may be followed. As shown in e.g. U.S. Pat. No. 4,530,020, it is known to provide a reference track adjacent to the outer diameter containing centerline information which is collected, digitized and stored as a digital record. The record is then accessed in synchronism with disk rotation to provide an error correction signal for correcting repeating spindle runout errors. In order to provide the regular periodic correction, the disk drive microcontroller must carry out servo service routines at regular intervals synchronized to disk rotation.

Similarly, in disk drives employing embedded servo sectors for head positioning, the disk drive microcontroller is interrupted at each servo sector and thereupon devotes its processing capability to determining present head position and developing any positional correction signal that may be required. An example of such a disk drive is found in commonly assigned U.S. Pat. No. 4,669,004, entitled "High Capacity Disk File with Embedded Sector Servo", the disclosure of which is incorporated by reference.

In the disk drive examples provided hereinabove, the need for regular periodic attention of the embedded microcontroller to service the head position servo loop has resulted in delays in performing other important tasks, such as host command overhead, host command cleanup, and cache memory management, for example. These delays have slowed data transfer operations. This drive performance drawback is overcome by the present invention.

Summary of the Present Invention with Objects

A general object of the present invention is to provide a method for allocating digital processing activities of an embedded microcontroller within a disk drive between a digital servo loop and a high level, digital interface to a host computing environment in a manner which overcomes limitations and drawbacks of the prior art.

A more specific object of the present invention is to provide a method for pausing a limited sequence of servo interrupts so that an embedded microcontroller of a disk file may have sufficient uninterrupted processing time for completing certain processes which occur at times not requiring precise head position control.

Yet another specific object of the present invention is to open an otherwise periodically closed head position servo loop for a limited time period in a fashion that enables a disk drive microcontroller to devote its processing attention to other tasks not related directly to head positioning, thereby improving overall data throughput rates for the disk drive.

In accordance with principles of the present invention, a method is provided for allocating digital processing activities of an embedded microcontroller within a disk drive between repetitive periodic digital servo loop service routines synchronized to rotation of a data storage disk of the drive and irregularly occurring host service routines supporting a high level, digital interface to a host computing environment. The new method essentially comprises the steps of:

prioritizing the host service routines into priority routines and non-priority routines, detecting calls to one of the priority routines, and bypassing execution of a predetermined number of the servo loop service routines to enable execution of the called priority routine without interruption.

Another way of expressing the present invention is by providing for a method for skipping a predetermined number of sequentially occurring head position servo service routines executed by an embedded microcontroller of a disk drive which performs dual functions of servo loop and data transfer to a host. This method comprises the steps of:

calling a servo pause firmware routine from a firmware routine related to data transfer, postponing servo service routine interrupts, adjusting a servo service routine counter to account for the predetermined number of servo service routines being skipped during a servo pause interval, adjusting a servo interval timer by adding to a next servo interval time a time interval number corresponding to the servo pause interval, and returning to the firmware routine related to data transfer so that it may be executed without interruption by servo service routines during the remainder of the servo pause interval.

As one aspect of this invention, the times of occurrence of the sequentially occurring head position servo service routines are synchronized to an index marker. In this regard, the method may comprise the further steps of:

detecting occurrence of the index marker, calling and executing an index interrupt service routine upon said detection, said index interrupt service routine for resynchronizing said servo interval timer. As a related aspect the new method may include the further step of inhibiting execution of the servo pause firmware routine during the index interrupt service routine.

Another aspect of this invention comprises the further steps of detecting a data reading or writing operation, or track seeking operation, and inhibiting execution of the servo pause firmware routine during the detected data reading or writing operation, or track seeking operation.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the Drawings:

FIG. 6 comprises a series of graphs arranged along a common horizontal time base. FIG. 6A illustrates normal division of microcontroller firmware operations between servo and main service routines. FIG. 6B illustrates receipt of a command from the host via the interface. FIG. 6C illustrates a pause or discontinuance of three consecutive servo service routines in accordance with principles of the present invention so that the incoming host command may be processed without being interrupted. FIG. 6D illustrates in summary fashion the status of drive operations along the same time base.

DETAILED DESCRIPTION OF A PREFERRED EMBODIMENT

Figure 1:
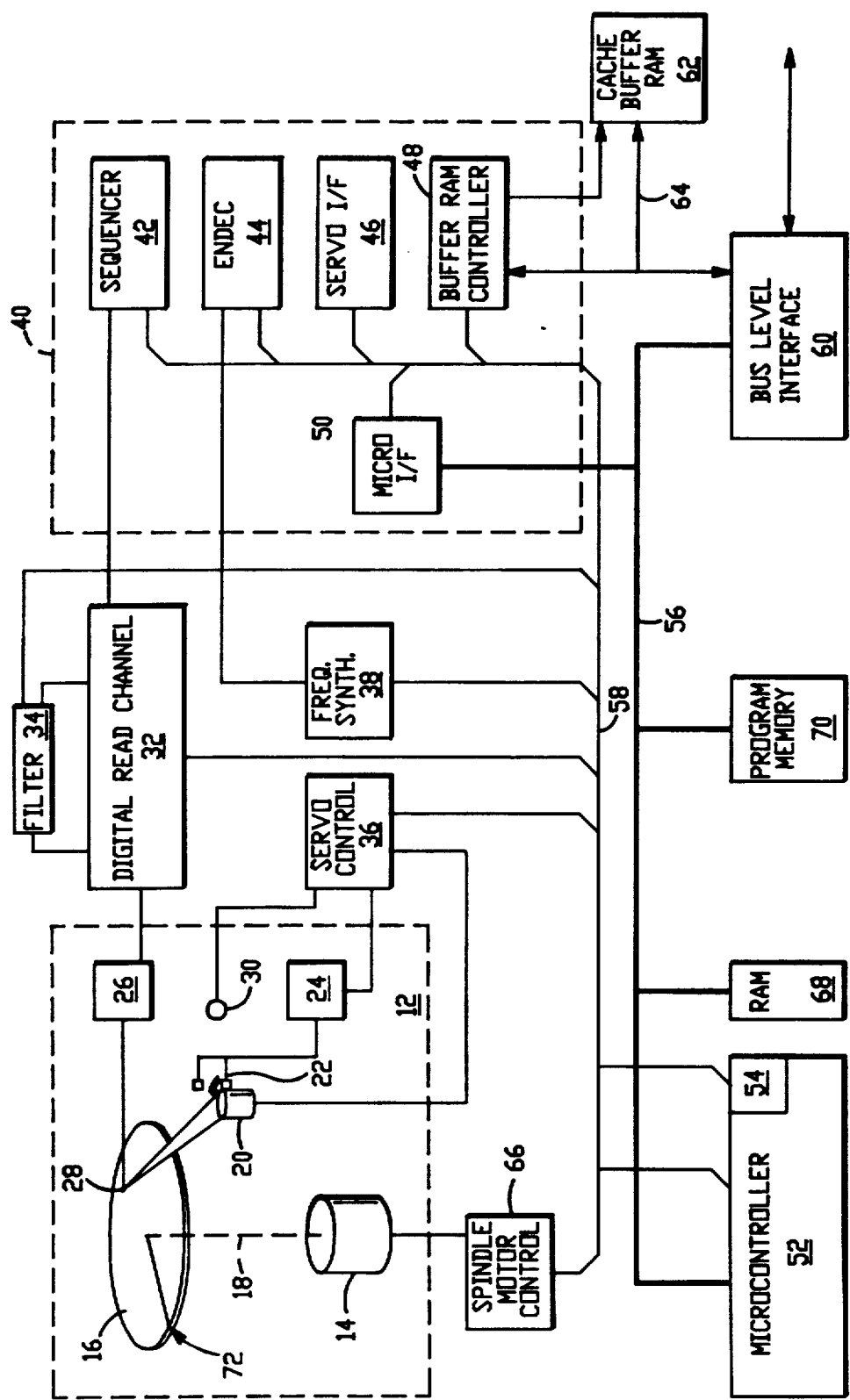
FIG. 1 is a simplified electrical block diagram of a disk drive data storage subsystem incorporating principles of the present invention.

With reference to FIG. 1, a disk drive 10 includes a head and disk assembly 12 including a poly-phase DC brushless spindle motor 14 and at least one data storage disk 16 mounted on a rotating spindle assembly 18 which is rotated at a constant angular velocity by the spindle motor 14. A mass balanced rotary voice coil actuator assembly 20 includes e.g. a poly-phase optical encoder assembly 22 including a fixed light emitter/photodetector array and a moving microline scale rotated by the rotary voice coil actuator 20. An encoder circuit 24 provides driving signals for the light emitter and amplifies the minute signals induced in the photodetector array of the encoder assembly 22. A read preamplifier/head select/write driver circuit 26 is connected to a plurality of e.g. thin film heads 28 which are ganged vertically and positioned in unison by the rotary actuator 20. A temperature sensor 30 is also provided in the head and disk assembly 12 to sense temperature variations occurring therein.

Figure 2:
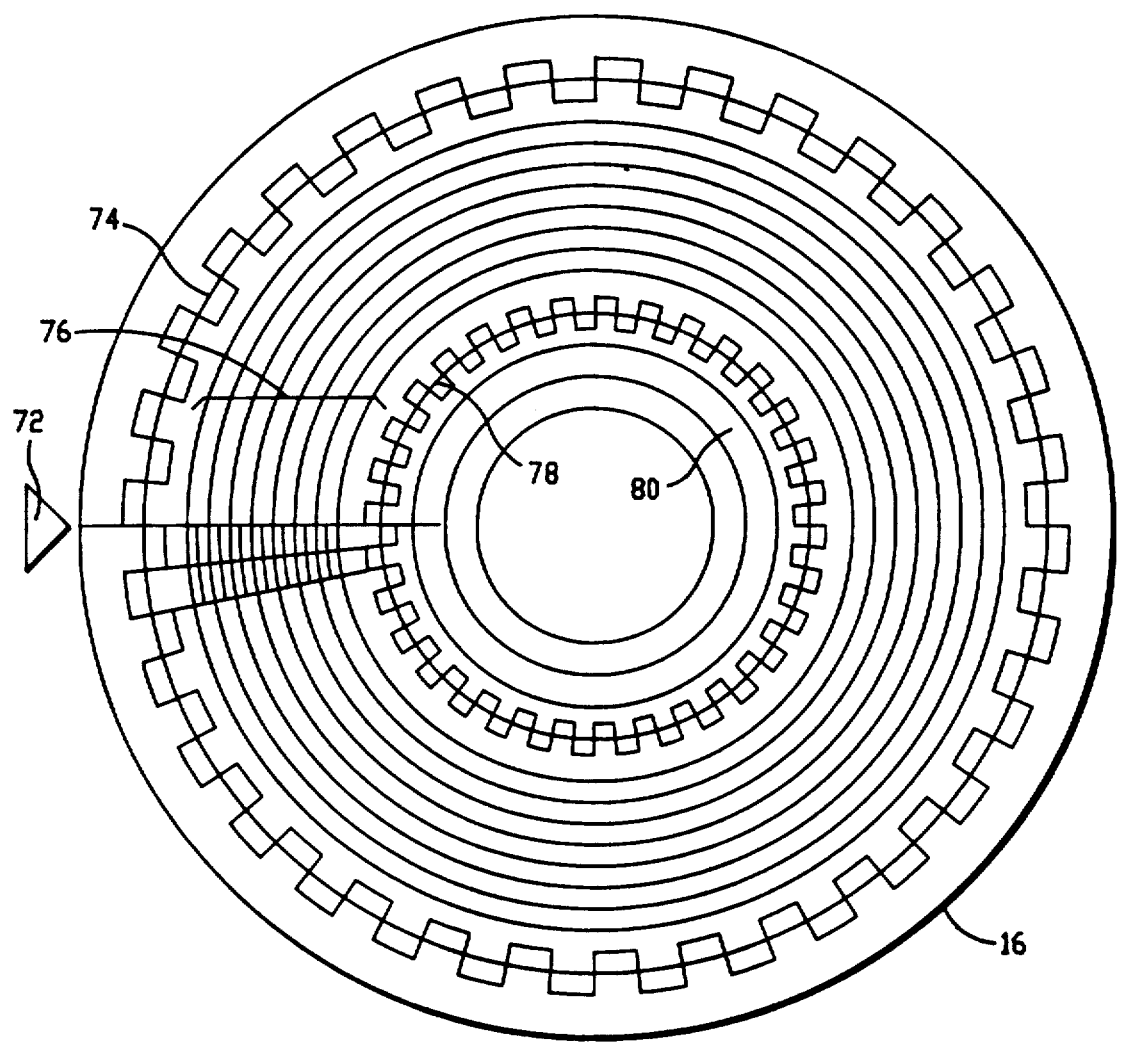
FIG. 2 is a highly diagrammatic depiction of a data storage surface of a disk of the FIG. 1 disk drive showing outer diameter and inner diameter servo tracks, and a multiplicity of data track zones lying between the outer and inner servo tracks. An index reference, denoted by a wedge, is also illustrated.

A digital read channel 32 includes a programmable-gain controlled preamplifier having an input for receiving data from the preamplifier 26 and an output leading to a programmable electronic filter 34. An output from the filter 34 leads back into the read channel 32. The digital read channel includes a phase locked loop for synchronizing raw data from the disk 16 to an internal clock. In addition, the read channel 32 includes peak detectors for detecting burst peak amplitudes read by the head 28 when passing over the servo tracks (FIG. 2).

A servo control circuit 36 provides circuitry supporting the optical encoder, and puts out two analog phase signals P1 and P2 which are converted to digital values with 11 bits of resolution to provide an angle servo following the locus of a circle in which eight adjacent track locations are defined by one traverse of the circle locus. Two digital comparison signals DIG-P1 and DIG-P2 are derived directly from the analog P1 and P2 signals and mark track boundary locations, thereby providing a count of tracks as the actuator is moved. The actuator driver circuitry is also present in the circuit 36. Pulse streams from two five-bit pulse width modulators are low pass filtered and then amplified to provide driving signals to a flat coil of the voice coil actuator 20. Opposite side segments of the coil are disposed in a gap having intense magnetic flux from oppositely facing permanent magnets, such that a current through the coil in one direction causes rotation in one direction, while reverse current causes rotation in the other direction. An electronic return spring is also included within the circuit 36 and when activated by power removal, rectifies and applies AC current from the spindle motor 14 acting as an alternator during spin down to the voice coil actuator 20 to move the heads 28 to a landing zone at an inner locus of the disk 16.

A frequency synthesizer 38 provides a master clock for an encoder/decoder 44, a microcontroller 52 and for an interface 60. A single crystal provides a reference frequency. Firmware executed by the microcontroller 52 enables the synthesizer 38 to generate and put out a plurality of different clocking rates to the encoder/decoder 44, so that zoned data recording rates are thereby supported among data track zones defined on the storage surfaces of the disk 16.

An integrated circuit 40 includes a programmable data sequencer 42, the encoder/decoder 44, a servo interface 46, a buffer RAM controller 48 and a microcontroller interface 50. The sequencer 42 includes a control store writeable by the microcontroller so as to control the processing of serial data blocks and headers thereof read back from the disk surface 16 during data reading operations and written to the disk surface during data writing operations. Format operations, and on-the-fly error correction operations are also supported by the sequencer 42. The encoder/decoder 44 supports 1,7 RLL coding of the data stream and puts out three code bits for every two data bits in accordance with the usual convention relating to 1,7 RLL coding techniques. The servo interface comprises a series of pulse width modulators which receive and latch digital values from the microcontroller 52 and convert those values into pulse streams. One pulse width modulator controls adjustment of the optical encoder assembly 20. Two modulators together provide 10 bits of resolution for the actuator amplifier of the servo control circuit 36. Two other pulse width modulators control the characteristics of the programmable electronic filter 34. Yet another pulse width modulator controls the AGC amplifier within the digital read channel 32.

The buffer RAM controller 48 generates block addresses for controlling storage and retrieval of data blocks in a cache buffer RAM 62. The cache buffer RAM 62 is preferably comprised of dynamic RAM, and the controller 48 therefore generates row and column refresh signals RAS and CAS in a conventional fashion and applies these signals to refresh the dynamic storage cells of the RAM 62. A 256 kilobyte cache memory array is preferred for the cache buffer ram 62 and thereby enables four 64 kilobyte cache pages to be defined under firmware control of the microcontroller 52. A microcontroller interface 50 provides for bus-level connection to the microcontroller 52 via a shared address/data bus 56. The numerous other control lines extending throughout the drive 10 are collected in another bus 58 as shown in FIG. 1.

The interface 60 provides a bus-level interface with a host computing system (not shown) with which the disk drive subsystem 10 is used. Accordingly, the interface 60 may support an AT bus structure or a SCSI bus structure. In an AT interface implementation, the interface 60 typically includes a host interface for receiving data blocks and commands from the host, a series of command registers which are accessible by the microcontroller 52 via a microcontroller interface connected to the address/data bus 56, a FIFO for the data blocks and a cache buffer RAM interface leading to a data bus structure 64 extending between the interface 60, cache buffer RAM 62 and the buffer RAM controller 48. Data blocks are passed between the interface 60, cache buffer RAM and the encoder-decoder 44 via the bus 64 during data block transfers of the disk drive 10.

A spindle motor controller 66 is connected to the spindle motor 14 and to the auxiliary bus structure 58.

The controller 66 receives phase commutation values from the motor 14 and passes motor speed monitoring and control signals to and from the microcontroller 52 via the bus 58. An index sensor circuit senses a once-per-revolution index mark 72 (FIG. 2) and thereby provides an index interrupt signal to the microcontroller 52. A spindle clock signal from the servo interface 46 provides a reference to which the controller 66 synchronizes disk rotation.

An external random access memory 68 extends available temporary storage by e.g. 8 kilobytes beyond the capacity of internal RAM of the microcontroller 52, so that dynamic values can be stored and updated during operation of the drive 10. A 32 kilobyte external program memory 70 likewise extends the amount of program memory available to store the control firmware executed by the microcontroller 52. The memories 68 and 70 are connected to the shared address/data bus 56. Most preferably, the microcontroller 52 is implemented as an NEC type 78322, or equivalent, which is clocked at a basic clocking rate of 16 MHz. Time critical routines of the firmware, and time critical dynamic values are stored in the onboard storage locations of the microcontroller 52, while the balance of the firmware and values are stored in the external program memory 70 and RAM 68.

Further structural and functional details of a preferred embodiment of the disk drive 10 are found in a copending, commonly assigned U.S. patent application Ser. No. 07/762,683, filed on Sep. 19, 1991 and entitled "Low Profile, High Capacity MicroWinchester Disk Drive" the disclosure of which is hereby incorporated herein by reference.

Turning now to FIG. 2, each data storage surface of each disk 16 defines a multiplicity of concentric tracks. The index marker 72 marks a once-per-revolution location on the storage surface illustrated in FIG. 2, and thereby establishes a timing and synchronization reference by which a runout data record may be collected. There are a series of eight outer servo tracks 74 of which only one is shown in the FIG. 2 simplified diagram. There are also eight inner radius servo tracks 78, with only one shown in FIG. 2. Each of the inner and outer servo tracks 74 and 78 comprises a series of circumferentially staggered, radially offset bursts of constant frequency recording, called A and B servo bursts. These bursts in the outer tracks and inner tracks are sampled to establish a servo data record during a calibration routine. An outer one of the servo tracks 74 is paired with an inner one of the servo tracks 78, and the radial offset values derived from the A/B servo bursts are averaged in order to develop and store a slope for a particular one of the eight phases of the optical encoder defining a track location. This process is then repeated for the other seven outer and inner tracks, and is further repeated for every storage surface of each disk, in accordance with the teachings set forth in the referenced U.S. Pat. No. 5,005,089, the disclosure of which is hereby incorporated by reference.

The outer servo tracks 74 are located inside of the outer periphery of the disk 16, and the inner servo tracks 78 are located outside of an inner landing zone 80 where the heads come into contact with the disk surface when the disk stops spinning. Each servo track 74, 78 is divided into e.g. 110 constant burst frequency A/B amplitude bursts. When the head 28 is following the track centerline, the peak amplitudes from alternating A and B bursts will be equal. With 110 servo samples per revolution, there are nominally 110 servo service routine interruptions per revolution, during which the firmware determines position based upon the P1 and P2 signals and corrects for runout based upon the runout data record stored in random access memory, and corrects for thermal offset based upon offset data collected and stored during an intermittent calibration operation. The radially outermost one of the outer servo tracks 74 is sampled during a runout data collection routine to develop the raw data needed to develop runout correction values for each data surface.

During track following operations, the physical track location number for a particular surface (head) identifies a stored slope value which is for the particular phase of the selected track location. The slope is then used with the physical track location by the microcontroller to calculate a thermal offset value for the particular track location. Then, the runout data record value for a particular sector location is added to the offset, and ultimately a head position correction value is generated and applied to the actuator 20.

Figure 3:
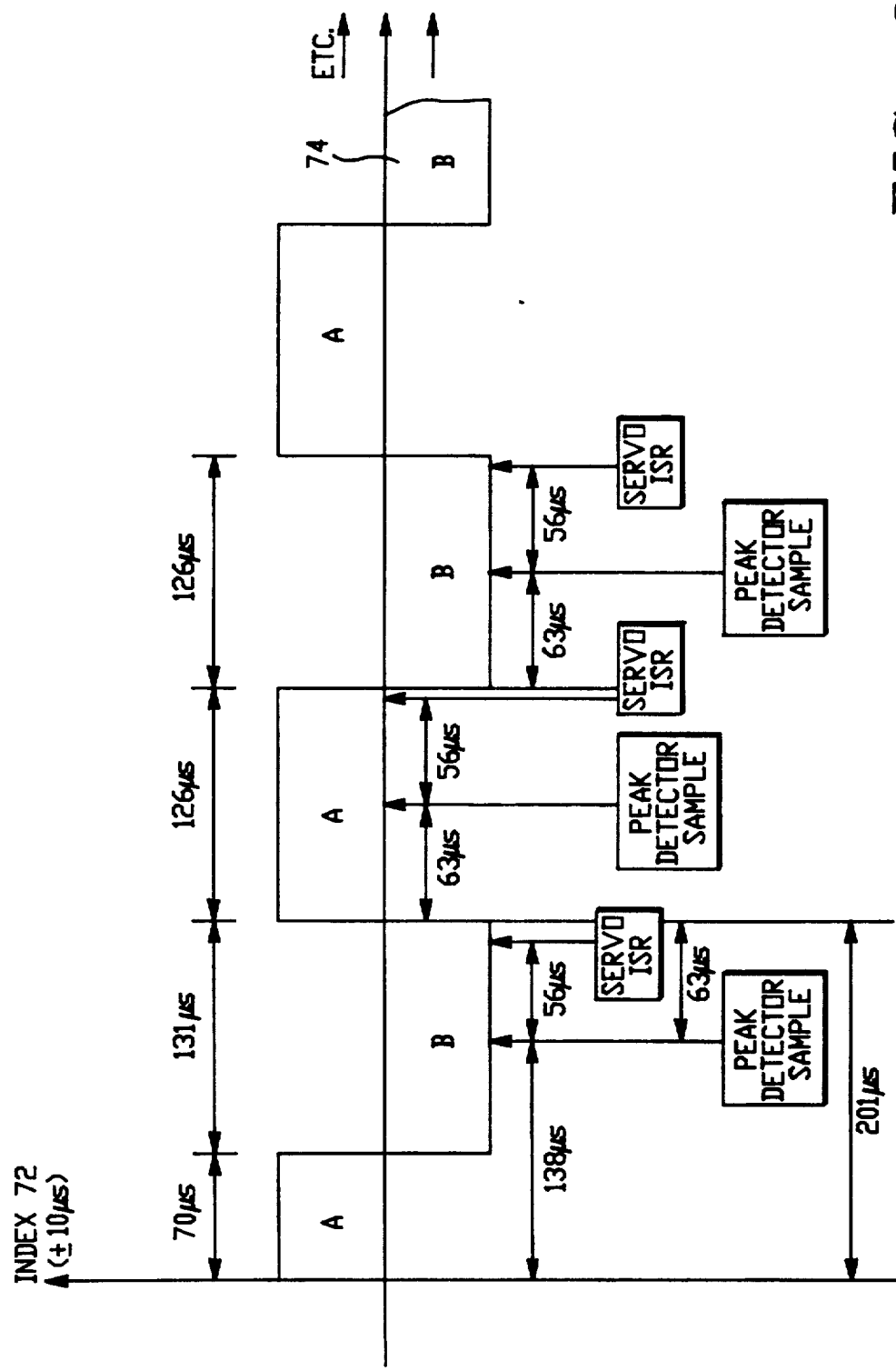
FIG. 3 is a timing diagram illustrating the relation between execution of a portion of a firmware routine for obtaining and recording spindle runout values from the outer servo track depicted in FIG. 2.

Turning to the FIG. 3 graph, during a calibration routine for obtaining the raw runout data, the data transducer head 28 is positioned over the outer servo track 74, and the constant frequency transitions within the A and B bursts are repetitively detected. A peak detector samples each of 54 A bursts and 55 B bursts (only the B burst of the first pair is sampled, there being 110 A and B bursts in total). Each burst, other than the first burst pair, is nominally 126 microseconds in duration, and the peak detector sample is taken after approximately 63 microseconds. At 56 microseconds following each peak detector sample, a servo interrupt service routine is called, and the sample is recorded in a table location corresponding to the particular circumferential position of the disk. Peak data from 108 samples are collected during the calibration routine, and after curve-fitting processing which eliminates e.g. noise and other interferences, offset data values are stored in a runout table for the particular data surface during the calibration routine. Similar tables are created for each of the other heads and disk surfaces of the disk drive 10. In this manner, spindle runout and head tilt for each data surface are compensated for during data transfer operations of the disk drive 10.

Timing for sampling of the recurrent A and B bursts of the servo track 74 is established by the microcontroller, based upon the index marker 72. The timers are resynchronized with each index pulse, thereby minimizing the effect of tolerances, such as spindle jitter. As shown in FIG. 3, the first A/B burst pair is non-symmetrical, and extends for a 201 microsecond interval from the spindle index marker 72. At a disk spindle rotational velocity of 4306, with no spindle jitter, 54 A and B burst samples are taken, and 115.3444 microseconds is left blank during the interval of rotation. With a +10 microsecond jitter, the blank space increases to 125.3444 microseconds. With a −10 microsecond jitter, the blank space is reduced to 105.3444 microseconds, for example.

Figure 4:
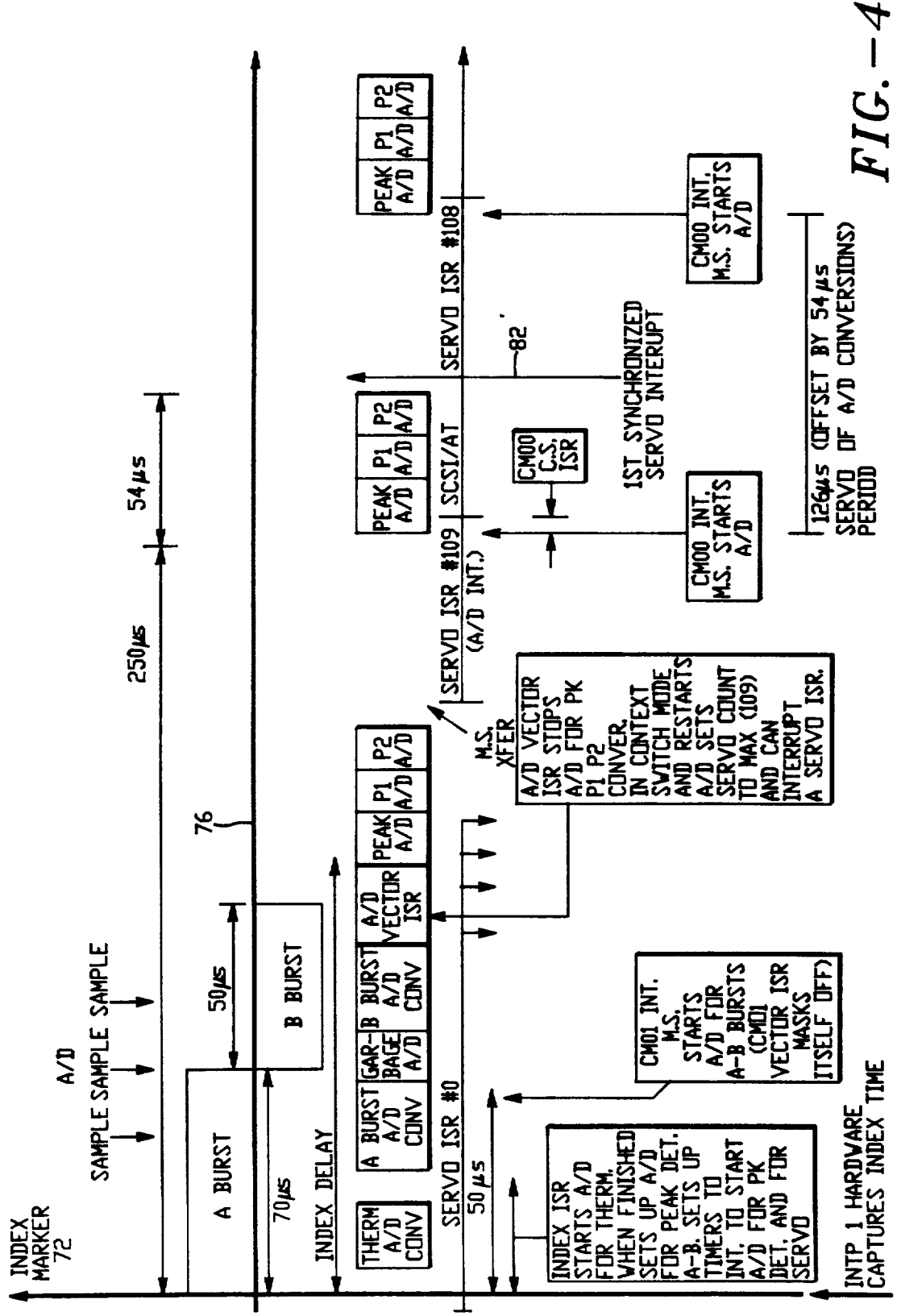
FIG. 4 is a timing diagram illustrating the relation between execution of a portion of a firmware routine during track following, illustrating generation of synchronized servo interrupt controls from the index reference.

As shown in FIG. 4, during track following operations when one of the concentric data tracks 76 is being followed by the head 28, the index marker 72 is used to trigger a hardware interrupt. The hardware interrupt is the highest priority interrupt and will under normal conditions cause an interrupt of servo interrupt service routine number zero which is the last servo service routine reached before the index marker 72. There are 110 servo interrupt service routines per revolution, and they decrement a counter from 109 to zero.

When the index interrupt occurs, a capture register is invoked which thereupon captures a count supplied by a free running counter. This count represents a latched time of occurrence of index. Based upon this captured time, other timers are set up to mark the location in time of the successive servo interrupts as well as events within the index interrupt service routine (ISR). The index ISR also starts an analog to digital conversion for converting temperature sensed by the temperature sensor 30 and then sets up the analog to digital converter 54 for peak detecting an A burst and a B burst occurring immediately following the index marker 72 in the data track 76. While these peak values are obtained and converted to digital values, they are used only for test purposes.

After a precisely timed index delay period of e.g. 50 microseconds, the index ISR causes a macro service interrupt which thereupon starts the A/D for A and B bursts in the data track 76 immediately following the index marker 72. After the B burst A/D macro service routine is completed, an A/D vector ISR is called, which stops the A/D converter 54, and sets it up to convert a peak value from the read channel, and two analog peak P1 and P2 optical phase values from the optical encoder 22. After the P2 value has been converted, a macro service transfer occurs which causes the servo data to be transferred within the microcontroller 52 and which then calls Servo ISR No. 109. The activities of the firmware during the servo portion of each Servo ISR are summarized in the discussion of the track following servo loop given below in connection with FIG. 5. The duration of the Servo ISR is approximately 75 microseconds, and leaves only 51 microseconds thereafter to the microcontroller for handling all of the host—disk command and status transfers, cache memory management, etc.

A comparator CM00 is set to cause an interrupt at 250 microseconds after index. During the time between index and the CM00 interrupt, Index ISR, conversion of the bursts, the A/D vector ISR, conversion of peak, P1 and P2 values, and a portion of the Servo ISR No. 109 occur. The CM00 macro Service interrupt starts the A/D converter 54 which performs the next peak, P1, and P2 conversions. The CM00 interrupt Service routine also resets a sector timer for a count corresponding to a 126 microsecond delay.

At the completion of the P2 analog to digital conversion, the servo data is again transferred, and an interrupt 82 is generated. The interrupt 82 marks the beginning of Servo ISR No. 108, and is the first servo interrupt which is synchronized (or resynchronized) to the precise occurrence of the index marker 72. After 126 microseconds, the CM00 interrupt macro service routine again starts the A/D converter 54, and this sequence is repeated for each of the other Servo ISRs, until the index marker 72 is reached once again.

Figure 5:
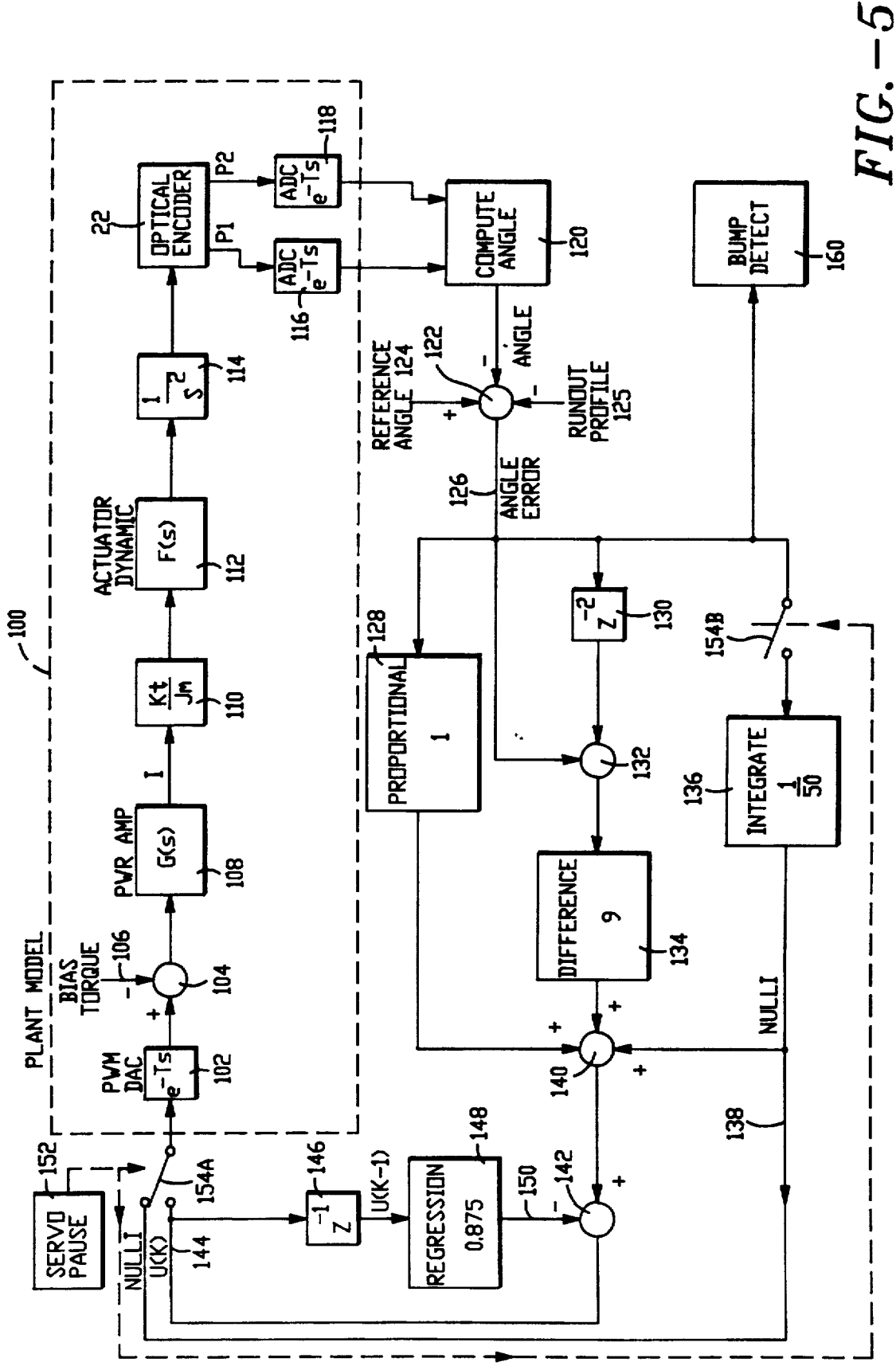
FIG. 5 is a diagram of a track following servo loop of the FIG. 1 disk drive data storage subsystem illustrating principles and aspects of the present invention.

Turning now to FIG. 5, a track following mode servo loop model 100 of the disk drive 10 includes a pulse width modulator 102 which includes a low pass filter and therefore functions as a digital to analog converter. A summing junction 104 subtracts lumped bias torque force designated by reference numeral 106 from the analog position signal put out from the PWM 102, to result in a driving signal which is applied to an actuator power amplifier 108 within the servo control circuit 36. The power amplifier 108 generates a driving current I which is applied to the actuator coil and results in a mechanical acceleration I* Kt/Jm, wherein the acceleration factor Kt/Jm is designated by a block 110. This acceleration is then applied to the rotary actuator structure 20 and results in an actuator dynamic F(s) model represented by a block 112. The dynamic model 112 results in movement of the actuator 20 and scale of the optical encoder 22 which is sensed by the two analog phase signals P1 and P2. The phase signals are converted to digital values by the analog to digital converter 54, (hardware processes designated 116 and 118 in FIG. 5). The digital amplitudes are thereupon supplied to the microcontroller 52.

During each 75-80 microsecond duration servo ISR, a substantial portion of the process overhead is spent computing an angle, a firmware process designated 120 in FIG. 5. The lissajous circle generated by the P1 and P2 phases of the optical encoder defines eight adjacent data tracks and is now divided into 2048 parts (an 11 bit analog to digital resolution). It takes about 25 microseconds to calculate the position on the lissajous circle from the digitized P1 and P2 values. The rest of the servo ISR is being spent comparing at a summing node 122 the computed angle from the process 120 with a reference angle denoted 124 and data of a runout profile to arrive at an angle error 126. The runout profile data provided at 125 is most preferably developed in accordance with copending, commonly assigned U.S. patent application Ser. No. 07/762,880, filed on Sep. 19, 1991, and entitled "Spindle Runout Prediction with Artifact Reduction for Disk Drive", the disclosure of which being hereby incorporated by reference herein.

The angle error 126 is used to develop a proportional term at a process 128, a difference term via processes 130, 132 and 134, and an integral term at a process 136. The proportional, difference and integral terms are summed at a summing process 140. A regression term is then subtracted from the resultant at a process 142 in order to shape the resultant transfer function U(k) to add robustness in order to realize additional gain and phase margin in the servo loop. The regression term is developed by processes 146 and 148 which put out a regression value to the summing process 142. A bump detect process 160 is also provided in the track following servo loop to detect off track movement of the actuator 20 in response to shock forces upon the drive 10.

In accordance with the principles of the present invention, a servo pause process 152 is included in the track following servo loop model depicted in FIG. 5. The servo pause process depicted in FIG. 5 includes the firmware operations described hereinafter for setting up the servo pause. During a servo pause interval, there is no activity within any firmware servo process including the elements 116 through 150 of the servo architecture diagrammed in FIG. 5, and the entire computational and data handling ability of the microcontroller 52 is available for another non-servo task or tasks.

Returning to the FIG. 5 servo loop diagram, the servo pause process 152 diagrammed therein also includes a switch 154A and a switch 154B. These switch functions are controlled in unison by a control 156 generated by the servo pause process 152. Ordinarily, the input to the DAC 102 is switched to receive the servo loop transfer function U(k), and the angle error 126 is switched to feed into the integral term process 136. However, during a servo pause, the switch 154A switches over to a last NULLI value 138 put out by the integral process 136, and that process stops being updated as servo operation is suspended. This temporary suspension in the NULLI update process is graphically depicted by opening of the switch 154B. (NULLI is defined as a null current or value which will cause no torque force to be generated at the rotary actuator 20). The NULLI value is substituted for the transfer function U(k) during servo pause, because the last transfer function put out before a servo pause may otherwise have resulted in a torque, leading to off-track movement of the actuator during the pause interval.

The four graphs presented in FIG. 6 along a common time base horizontal axis illustrate operation of the servo pause process 152. The first graph, FIG. 6A, illustrates normal un-paused operation in which each servo ISR requires about 80 microseconds, and each data controller phase is left only about 46 microseconds. FIG. 6B marks the time of receipt of a command from the host via the interface 60. Servo pause 152 is immediately invoked and three servo ISRs are skipped, thereby freeing the microcontroller 52 for a period of 378 microseconds, during which its undivided attention is given to handling the command overhead associated with receiving, decoding and executing the host command.

Ordinarily, the host command may require a seek operation. If the seek is of more than 28 tracks in radial length, a fast seek, an angle seek, a settle mode, and on track will be successively invoked, as noted in FIG. 6B. For seeks of length less than 28 tracks, the seek will be an angle seek, followed by a settle mode seek, and then the on track mode. For single track seeks, a settle mode seek is invoked. Once the seek is started, the next servo ISR is performed, so that the microcontroller will be in control of the actuator 20. After the actuator has reached the destination cylinder location (track position for a selected head) and has settled, write (wr) and/or read (rd) operations will be carried out, during which no servo pause will occur, as precise following of the selected data track will be needed. During seeks of the settle mode type, no servo pause will occur.

Figure 7A:
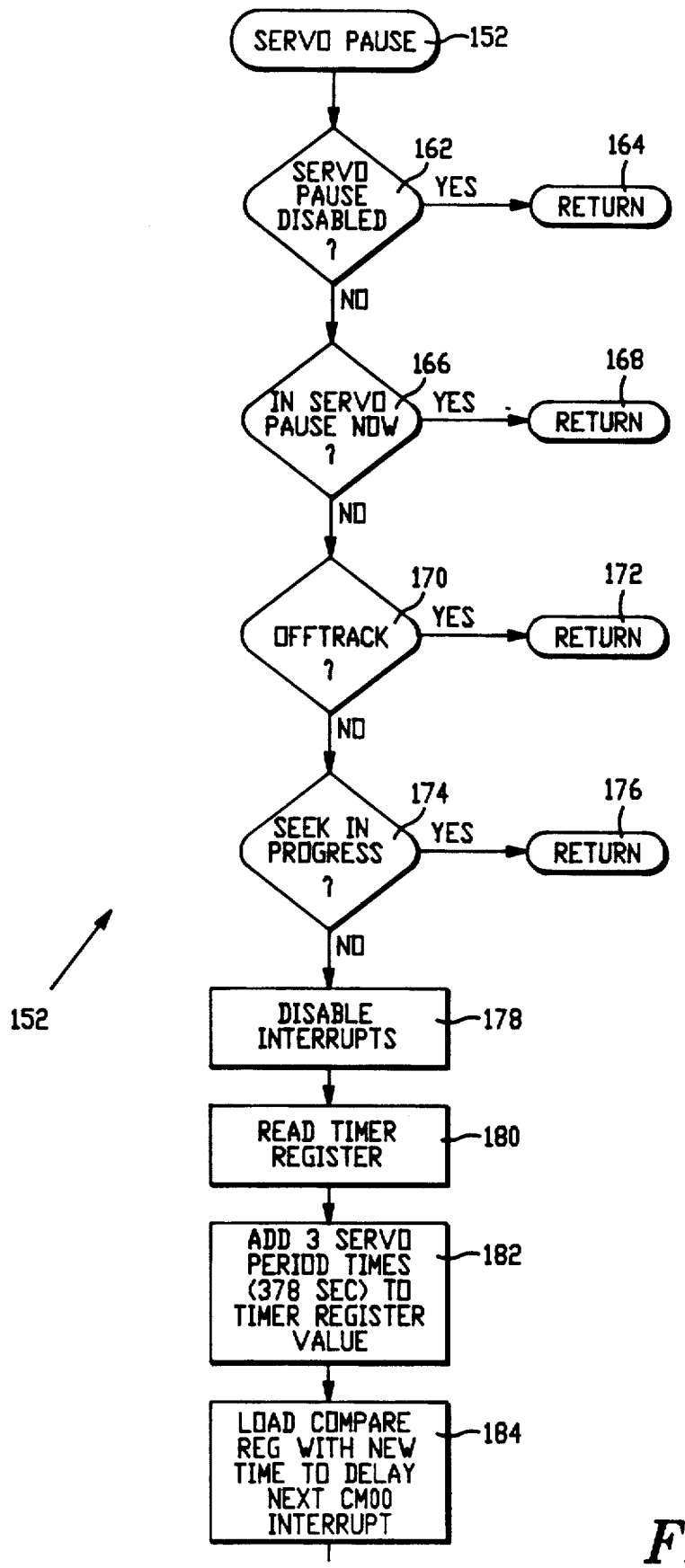
FIGS. 7A and 7B comprise a single flowchart illustrating operation of a servo pause service routine within the firmware of the FIG. 1 drive in accordance with principles of the present invention.
Figure 7B:
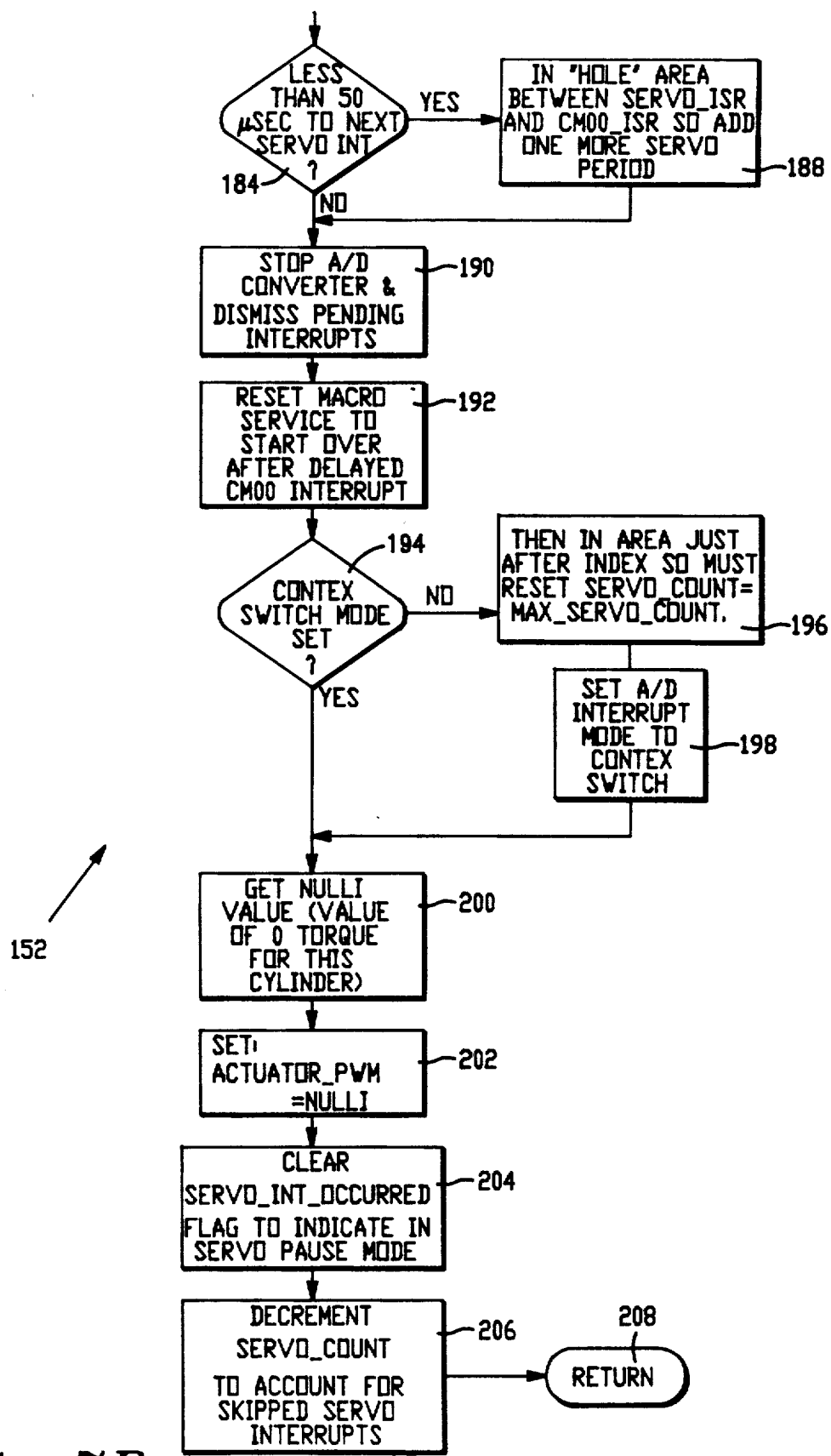

The flow of the servo pause routine 152 is charted in FIGS. 7A and 7B. When the routine 152 is called, a first logical node 162 determines if servo pause is disabled. One condition disabling the servo pause routine is that the microcontroller 52 is executing, or is about to execute, the index ISR. If servo pause is disabled, a return is made at node 164. If not, a logical node 166 determines if the firmware is presently in servo pause, and if so a return is made at a node 168. If not, a logical node 170 determines if the actuator 20 is presently off-track. If the actuator is off-track, a return is made at a node 172. If not, a logical node 174 determines if a seek is presently in progress. If the drive 10 is seeking, a return is made at a node 176. If a seek is not in progress, a node 178 causes the interrupts to be disabled for the servo ISRs. The servo timer register is read at a node 180, and three servo period times (378 microseconds) are added to the timer register value at a process node 182. A process node 184 then loads the compare register CM00 with the new time to delay until the next CM00 macro service ISR (FIG. 4).

Turning now to FIG. 7B, a logical node 186 determines whether there are less than 50 microseconds left in the CM00 compare register to the next CM00 macro service interrupt. If so, the firmware is located in time in an area between the servo ISR and a CM00 ISR, and so a process 188 adds one more servo period to the time added by the step 184.

A process step 190 stops the analog to digital converter 54 and dismisses pending interrupts coming from servo service functions. A step 192 then resets the CM00 macro service routine to start over after the delayed CM00 interrupt occurs. A logical node 194 determines if the context switch is set, and if not, the head 28 is located in a area just after the index marker 72, and a block 196 resets the servo ISR count to a maximum value. A second process 198 in this branch then sets the analog to digital interrupt mode to context switch, thus reenabling the servo interrupts to occur following the next delayed CM00 interrupt.

A step 200 obtains the last NULLI value from the integral term process 136 of the servo loop on the path 138. A step 202 causes the NULLI value on the path 138 to be set into the actuator pulse width modulator 102 (designated by the position of switch 154A in FIG. 5). A step 204 clears a flag labelled the "SERVO_IN-T_OCCURRED", which informs the firmware that a servo pause 152 has been entered. Finally, a step 206 decrements a value SERVO_COUNT which decrements the servo ISR counter to account for the number of servo ISRs which are being skipped. A return is made at a node 208, and the microcontroller is then freed by the remaining time period in the servo pause to devote its undivided attention to handling command set up, cleanup and cache memory hit transactions, for example.

Ordinarily, and most preferably, three servo ISRs are skipped during a servo pause which is thereby of approximately 378 microseconds in duration. However, as suggested above, since it is necessary to synchronize the servo ISRs to the index marker on a once per revolution basis, if servo pause is invoked right before occurrence of the index marker 72, the servo pause function will be preempted during index ISR and bypassed at the process node 162. If the servo pause routine 152 is called e.g. at two servo ISR periods before the index marker period (servo ISR #1), there will be a pause of a duration corresponding to the two servo ISR periods, but not three, since index ISR will restart servo activity.

So that the disk drive actuator does not lose track of head position, a servo ISR must be executed between successive servo pauses. Thus, a first pause may skip servo ISR Nos. 105, 104, 103. Servo ISR No. 102 is then executed and a head position correction is made. Servo pause may then be invoked for servo ISR Nos. 101, 100 and 99, etc. Also, servo pause is never invoked during data writing to disk, or seeking operations of the disk drive 10.

By limiting the number of servo ISRs skipped during a servo pause to e.g. to three out of a total of 110 servo ISRs per revolution of the disk 16, only a small percentage of a single disk rotation occurs during the servo pause interval. Thus, it is unlikely that the actuator 20 and data head 28 will have travelled very far off of the centerline of the data track during the "open loop" duration of the servo pause. This arrangement has been found to be an ideal compromise between the need for uninterrupted processing time for some command and cache management processes and the need for positive servo control of the disk drive actuator 20. If longer intervals are needed for execution of command or data transfer processes, a greater number of servo ISRs may be skipped, with an increased potential that the head will move farther off of the track centerline during the servo pause. The number of servo ISRs that may be skipped without undue delay in subsequently returning the actuator to on-track alignment will be a function of a particular disk drive characteristics, such as the stiffness, bandwidth, and phase and gain margins of the servo loop.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A method for skipping a predetermined number of sequentially occurring head position servo service routines executed by an embedded microcontroller of a disk drive which performs dual functions of servo loop and data transfer to a host, comprising the steps of:
    calling a servo pause firmware routine from a firmware routine related to data transfer,
    disabling servo service routine interrupts,
    adjusting a servo service routine counter to account for the predetermined number of servo service routines being skipped during a servo pause interval.
    adjusting a servo interval timer means by adding to a next servo interval time a time interval number corresponding to the servo pause interval, and
    returning to the said firmware routine related to data transfer so that it may be executed without interruption by servo service routines during the remainder of the servo pause interval.

2. The method set forth in claim 1 wherein the times of occurrence of said sequentially occurring head position servo service routines are synchronized to an index marker means.

3. The method set forth in claim 2 comprising the further steps of:
    detecting occurrence of said index marker means,
    calling and executing an index interrupt service routine upon said detection, said index interrupt service routine for resynchronizing said servo interval timer means.

4. The method set forth in claim 3 comprising the further step of inhibiting the step of disabling servo service routine interrupts during execution of said index interrupt service routine.

5. The method set forth in claim 1 comprising the further steps of detecting a data reading or writing operation, and inhibiting execution of said servo pause firmware routine during said detected data reading or writing operation.

6. The method set forth in claim 1 comprising the further steps of detecting an actuator seeking operation, and inhibiting execution of said servo pause firmware routine during said detected actuator seeking operation.

* * * * *